(12) United States Patent
Ryan

(10) Patent No.: US 6,668,940 B1
(45) Date of Patent: Dec. 30, 2003

(54) CULTIVATOR POINT ASSEMBLY

(76) Inventor: Austin Timothy Ryan, 19 Hewitt Street, Warracknambeal, Victoria 3393 (AU)

( * ) Notice: Subject to any disclaimer, the term of this patent is extended or adjusted under 35 U.S.C. 154(b) by 0 days.

(21) Appl. No.: 09/856,045

(22) PCT Filed: Nov. 18, 1999

(86) PCT No.: PCT/AU99/01026

§ 371 (c)(1),
(2), (4) Date: Aug. 20, 2001

(87) PCT Pub. No.: WO00/28803

PCT Pub. Date: May 25, 2000

(30) Foreign Application Priority Data

Nov. 18, 1998 (AU) ................................................ PP7150

(51) Int. Cl.[7] .......................... A01B 15/02; A01B 15/06; A01B 23/02; A01B 35/26
(52) U.S. Cl. ........................ 172/751; 172/753; 172/762; 37/455; 403/4; 403/24; 403/353; 403/375
(58) Field of Search .............................. 172/749, 750, 172/751, 681, 699, 719, 753, 762, 772, 772.5, 776; 37/450, 452, 455, 456; 403/4, 3, 21, 22, 24, 292, 293, 294, 341, 345, 353, 355, 375, 379.3, 408.1

(56) References Cited

U.S. PATENT DOCUMENTS

| 1,328,740 | A |   | 1/1920  | Huggins |          |
|-----------|---|---|---------|---------|----------|
| 2,712,280 | A |   | 7/1955  | Peoples |          |
| 3,104,724 | A |   | 9/1963  | Pollock |          |
| 3,770,066 | A | * | 11/1973 | Young   | 172/194  |
| 4,078,866 | A |   | 3/1978  | Hawkins |          |
| 4,115,021 | A |   | 9/1978  | Loch    |          |
| 4,195,697 | A | * | 4/1980  | Griffin | 172/730  |
| 4,497,141 | A |   | 2/1985  | Jarby   |          |
| 4,605,335 | A |   | 8/1986  | Otrusina |         |
| 4,653,412 | A | * | 3/1987  | Clarke  | 111/73   |
| 4,779,686 | A |   | 10/1988 | Ryan    |          |
| 4,782,774 | A | * | 11/1988 | Clarke  | 111/73   |
| 5,027,907 | A | * | 7/1991  | Delyea  | 172/707  |
| 5,651,418 | A | * | 7/1997  | Jerez   | 172/14   |

FOREIGN PATENT DOCUMENTS

| DE | 2 146 072 | 4/1973 |
| EP | 0 152 892 | 8/1985 |
| GB | 1 365 720 | 9/1974 |
| GB | 2 322 060 | 8/1998 |
| WO | 89/07206  | 8/1989 |

* cited by examiner

Primary Examiner—Christopher J. Novosad
(74) Attorney, Agent, or Firm—Larson & Taylor, PLC

(57) ABSTRACT

A cultivator point assembly includes an adaptor having a front and a rear end, and intended to be mounted to a cultivator machine at an upper end and having a foot projecting from a lower end. A cultivator point is adapted to be engaged with the adaptor and has a mounting section and a forward ground-working edge. An aperture in the mounting section is adapted to receive the foot of the adaptor in a first reversed position, whereafter the cultivator point is rotated 180° relative to the adaptor into an intermediate position in which the ground working edge is in a forward facing position relative to the adaptor, and is then moved rearwardly relative to the adaptor into a working position. A stop in use prevents unintentional detachment of the cultivator point from the adaptor.

7 Claims, 4 Drawing Sheets

CULTIVATOR POINT ASSEMBLY

The present invention relates to a cultivator point assembly including a cultivator point and an adaptor for fixing to a cultivator.

With up to 250 cultivator points per cultivator or airseeder machine, cultivator point performance and reliability is of great concern to farmers. Developments in the area of tillage and seeding machinery have seen cultivator points acquire a wide, wedge-like shape which slices through the ground separating the soil with minimum undesirable turning. Turning of the soil exposes cloddy lumps and mixes straw in with good soil.

A further important consideration is the time and labour spent in changing cultivator points after wearing. Certain types of points require considerable force and encouragement to detach from the tyne, especially if they are caked with mud and straw. It can take one person several hours to change all points on a cultivator.

A major problem with points is that they become loose and can fall off the machine. Generally, cultivator points are either connected to adaptors which are fixed onto a depending cultivator tyne by a bolt or are directly connected to the tyne by some fastening means. Points are more likely to loosen as the machine turns around in a field or when the points are lifted off the ground for transportation to and from a field. As they hang off the tynes the points are subjected to vibrations and random movement resulting from the rough ride of the cultivator vehicle on uneven ground. Consequently, the points are often dislodged from a ground working position and then from the tyne altogether. If the farmer is not aware of this and proceeds to till or sow a field great losses can result in wasted seeds and fertilizer. Time is lost returning to the field to complete the task and crop is lost if the farmer has not realised the ground was not cultivated.

Points which are strapped or press fitted onto the tyne require little impact to detach from the tyne. A rock in the path of the point during operation could force the point upward and cause it to dislodge.

To overcome this problem it has been known to attach the cultivator point to the adaptor by a "twist-on" arrangement. This comprises fitting the point on an adaptor by positioning the point while in a reversed position so that a keyhole of the point receives a flange of the adaptor and rotating the point 180° and moving it into a working position. While this arrangement somewhat. reduces the incidence of detaching points, it is not entirely effective as rotation of the point through 180° and detachment will still occur with larger vibrational or random forces or with larger ground impacts.

There is therefore a need for a cultivator assembly in which the cultivator point can be quickly and reliably attached to an adaptor on a cultivator.

According to the present invention there is provided a cultivator point assembly including:

an adaptor having a front and a rear end, and intended to be mounted to a cultivator machine at an upper end and having a foot projecting from a lower end;

a cultivator point adapted to be engaged with the adaptor and having a mounting section and a forward ground-working edge;

an aperture in the mounting section which is adapted to receive the foot of the adaptor in a first reversed position, whereafter the cultivator point is rotated 180° relative to the adaptor into an intermediate position in which the ground working edge is in a forward facing position relative to the adaptor, and is then moved rearwardly relative to the adaptor into a working position; and a stop means which in use prevents unintentional detachment of the cultivator point from the adaptor.

The present invention is described further by way of example with reference to the accompanying drawings of which:

Figure 1:
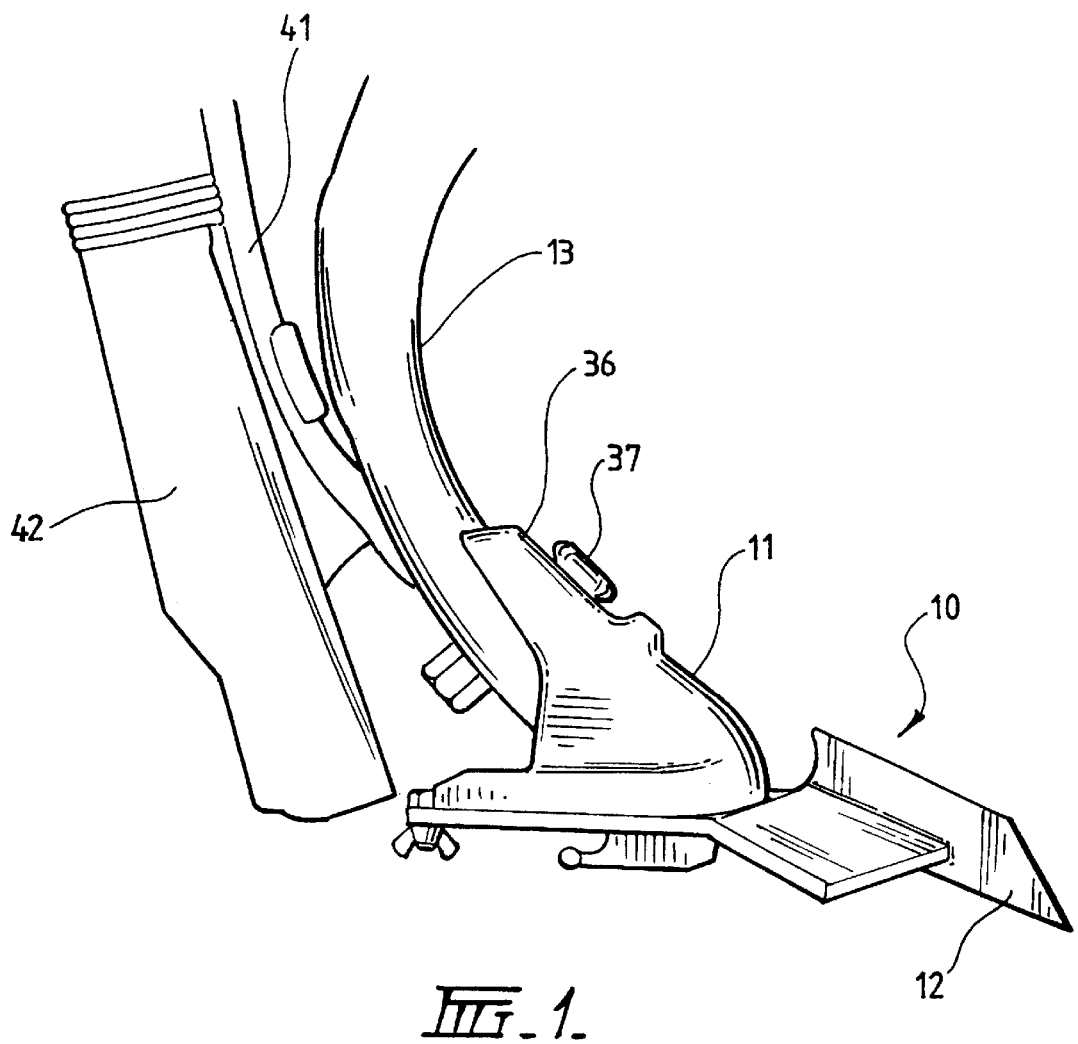
FIG. 1 is a side view of a preferred embodiment of the cultivator point assembly of the present invention attached to a tyne.

The cultivator point assembly of the present invention, generally denoted as 10, comprises an adaptor 11 and a cultivator point 12. The adaptor is fixed to a depending tyne 13 of a cultivator machine as shown in FIG. 1. The cultivator point is made of cast iron or steel and has a sharp, forward ground working edge 25 which contacts the ground. The ground working edge is in a forward facing position relative to the assembly.

An aperture 17 in a mounting section 18 of the cultivator point 12 receives a foot 16 projecting from a lower end of the adaptor. The aperture is roughly the shape of a keyhole with a main circular opening 17*a* and an elongate opening 20. The cultivator point initially receives the foot of the adaptor in a reversed position, the point being then rotated approximately 180° about the foot into an intermediate position. The cultivator point is then moved into a working position along the elongate opening 20 of the aperture 17, with peripheral edges 19 of elongate opening 20 slidably engaging lateral grooves 21 on either side of the foot. The cultivator point is thus easily and quickly engageable with the adaptor. Elongate opening 20 tapers from the aperture 17 so that the further the elongate opening 20 moves on the foot of the adaptor, the more the point will wedge onto the adaptor, thereby providing a tighter engagement of the point and adaptor.

Figure 5:
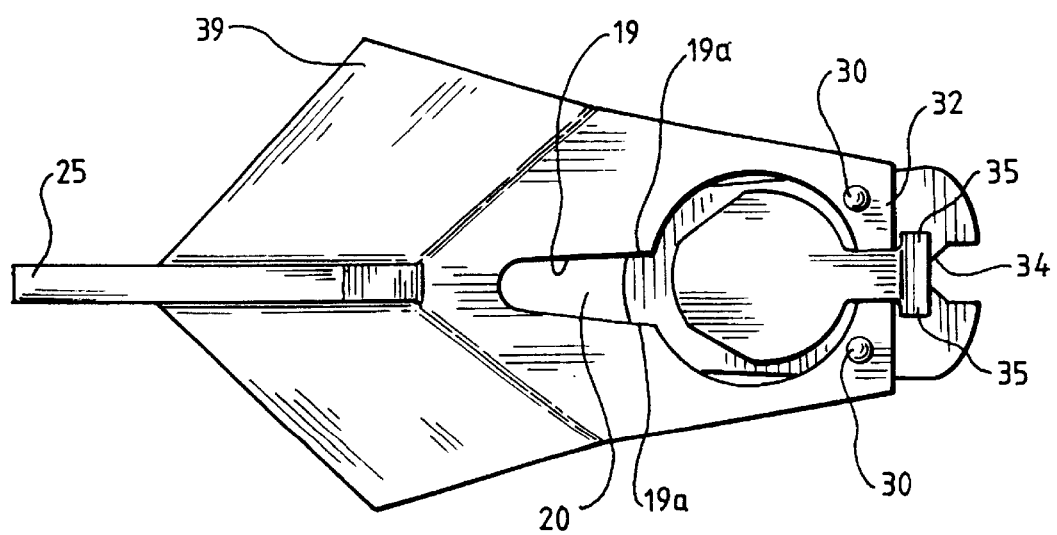
FIG. 5 is a plan view of the underside of the cultivator point assembly.

During normal, smooth operation of the cultivator, the movement of the point through the ground wedges the point onto the adaptor in the working position. However, it is foreseeable that the cultivator point could be knocked from its working position in which case the knocking force will cause the point to travel past the intermediate position and into a forward position as shown in FIG. 5. One or more stopping means on the cultivator point prevent the cultivator point rotating and disengaging unintentionally. The stopping means will comprise a first structure on the cultivator point and a second structure on the adaptor, wherein the first and second structures cooperate with each other to prevent unintentional disengagement of the adaptor and the cultivator point. Nodes 30 on the underside of the cultivator point engage with the foot, or more specifically, with a tail section 26 of the foot so as to prevent the point rotating 180°. There are two nodes spaced from one another approximately 90° on the circumference of circular opening 17*a*. It is understood that the nodes could be spaced closer together to further limit rotation of the cultivator point.

The stopping means may also include a nut 33 and a bolt 31 inserted in a bore located at the rear 32 of the cultivator point. The bolt is inserted after the point is assembled onto the adaptor and protrudes from the upper surface 18a of the mounting section. As the cultivator point is knocked into the forward position a complementary recess 34 on the adaptor engages with the bolt protruding upwardly at the rear of the cultivator point. The complementary recess is shaped according to the head of the bolt such that the recess and bolt head conform with one another and engage. The cultivator point is unable to rotate when the bolt head and complementary recess are engaged. In the absence of a recess 34, the rear portion of a base 14 of the adaptor will contact the bolt head before the point moves into the intermediate position. Once again, the cultivator point is therefore unable to rotate and detach from the adaptor.

It is understood that any other reasonable detent can be used in place of the nut and bolt. One example is a ring pin which finds wide use in agricultural equipment.

Figure 6:
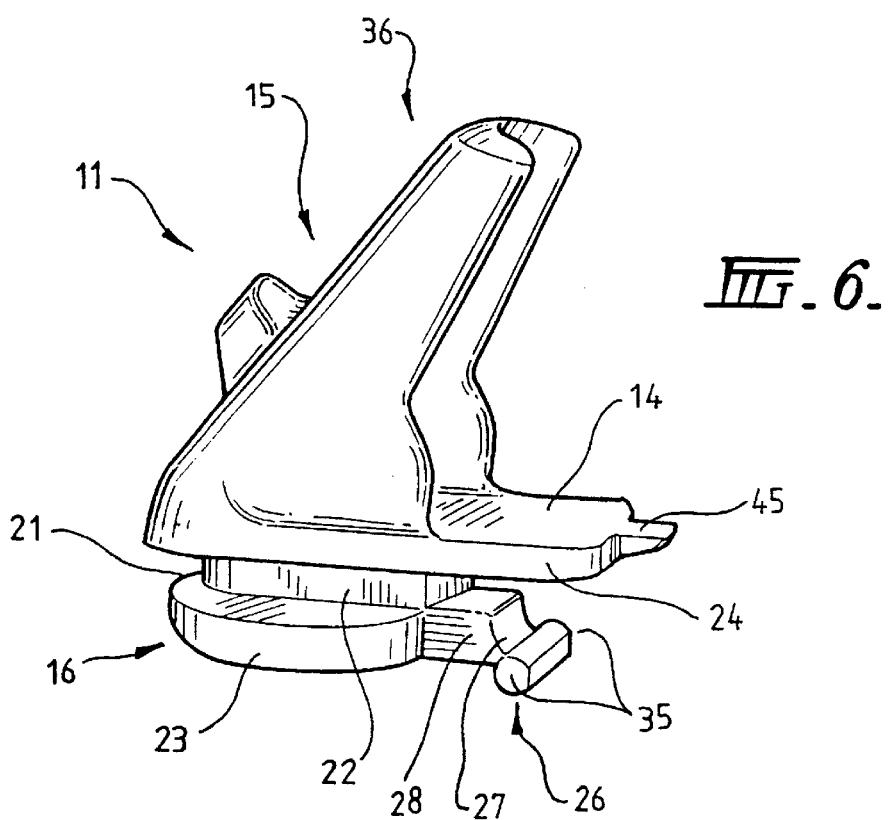
FIG. 6 is a perspective view of a second embodiment of the adaptor of the cultivator point assembly.
Figure 7:
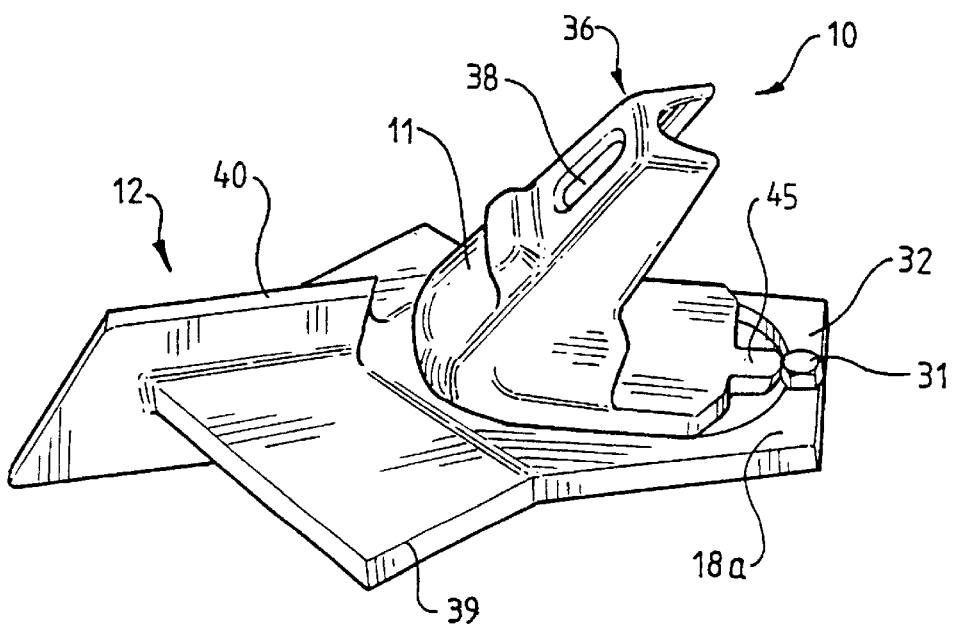
FIG. 7 is an upper perspective view of the cultivator point assembly with the adaptor of the second embodiment.

A second embodiment of the adaptor is illustrated in FIG. 6 and defines an alternate stopping means. This embodiment also incorporates a bolt 31 through the rear 32 of the cultivator point, but rather than a complementary recess, a tongue 45 protrudes from the rear of the adaptor 11. If the cultivator point is knocked, the tongue 45 is designed to abut the head of bolt 31. The length of the tongue is such that it will abut the bolt before the cultivator point can be knocked into the intermediate position. Since the cultivator point cannot be brought into the intermediate position, there is no opportunity for it to rotate off the adaptor.

Figure 4:
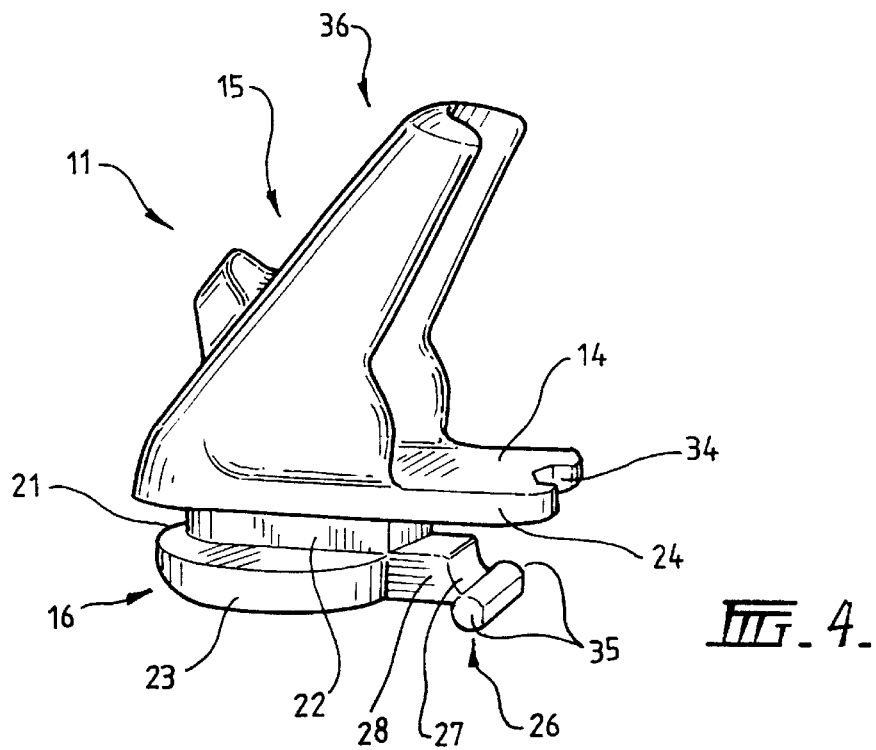
FIG. 4 is a perspective view of the adaptor of the cultivator point assembly.

As most clearly illustrated in FIG. 4, adaptor 11 comprises the base 14, a rear-facing concave support 15 projecting upwardly of the base and a foot 16 projecting downwardly of the base. Complementary recess 34, or tongue 45, is located on the rear edge of the base. A root 22 of the foot 16 is substantially rectangular in shape and immediately adjacent the base. The root 22 is thinner and shorter in length than the base and projects from a forward position on the underside of the base and substantially central of the width of the base. Adjacent the root 22 a flange 23 forms a laterally flared end of the foot which has a width comparable to the width of the base. The flange flares outward of both sides of the adaptor as well as from the front end of the adaptor. The flange is spaced from the edges 24 of the base. Root 22 is recessed in relation to flange 23 and base edges 24. Together, flange 23, base edges 24 and recessed root 22 define the lateral grooves 21 on the sides of the adaptor which engage with peripheral edges 19 of the cultivator point.

Tail section 26 has a rectangular portion 28 which extends rearwardly of the foot and is in the same plane as the flange such that it too is spaced from the base. The end of the tail section is defined by a stepped recess 27 with the cut-out portion forming the step facing upwardly towards the underside of the base 14. The stepped recess facilitates intentional rotation and removal of the cultivator point in the intermediate position because the nodes 30 pass under the stepped recess without inhibiting rotation. In the forward position, rotation is not possible since the cultivator point is more forward of the adaptor than in the intermediate position and thus nodes 30 intercept with rectangular portion 28 or the flange 23.

Two lateral knobs 35 project transversely from the stepped recess on the end of the tail section. From a plan view of the adaptor as illustrated in FIG. 5, the lateral knobs form a widened, T-shaped termination of the tail section. This feature has effect when the cultivator point is in the reversed position, that is, after it has received the foot of the adaptor. Essentially, the lateral knobs prevent the cultivator point disengaging from the foot by contacting peripheral edges 19a of the elongate section 20 of the aperture. The lateral knobs are effectively a further preventative means of the cultivator point detaching from the adaptor by acting as stops against edges 19a when in the reversed position. To locate the cultivator point on the foot it is therefore necessary to firstly tilt the point at an angle which allows the tail section of the foot to be inserted in the circular opening 17a first.

Tongue 45 acts as a further preventative means when the cultivator point is in the reversed position. It ensure that unless the tongue 45 is correctly aligned with elongate section 20, the adaptor will not be detached. The tongue in combination with the tail section and flange 23 of the adaptor provide a narrow margin in which to correctly align the point in the aperture 17 for detachment. In other words, detachment will not occur unless the cultivator point is rotated to the correct alignment and tilted at the correct angle.

Figure 2:
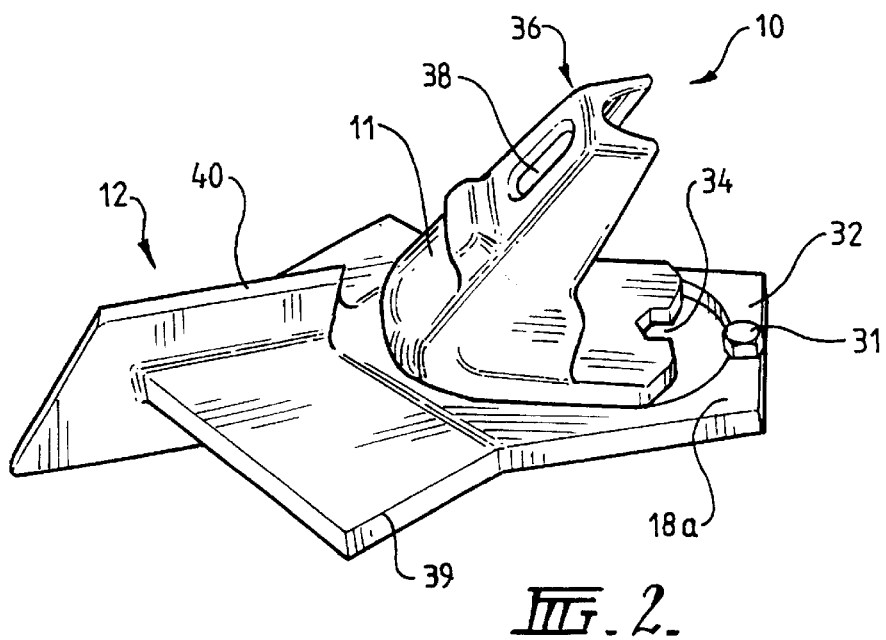
FIG. 2 is an upper perspective view of the cultivator point assembly.
Figure 3:
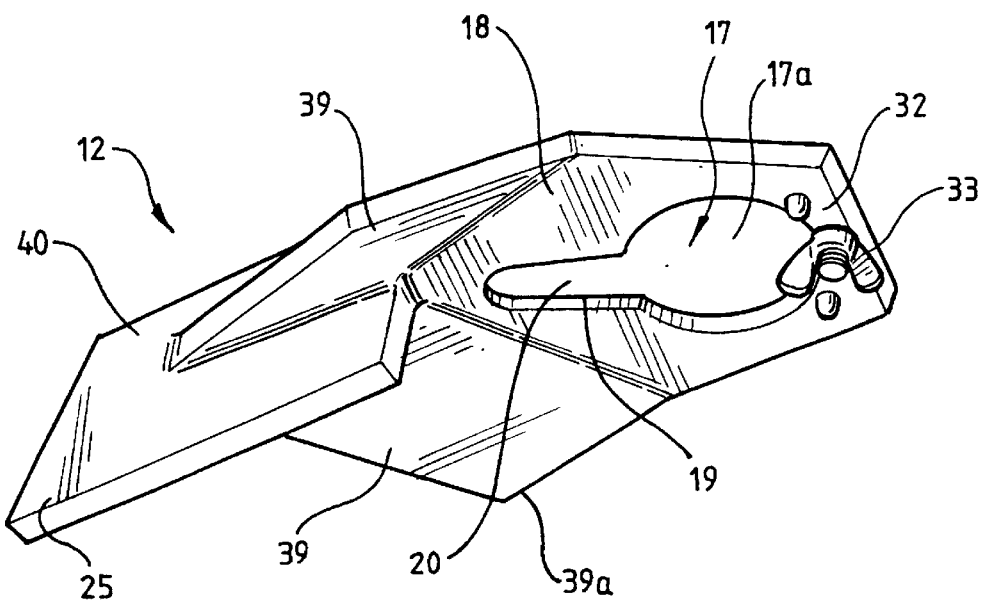
FIG. 3 is a lower perspective view of the cultivator point of the cultivator point assembly.

Once the tail section and the tongue (in the second embodiment of the adaptor) has been inserted in the circular opening 17a, the flange and the rest of the foot is inserted into the circular opening bringing the assembly into the reversed position. The cultivator point is next rotated 180° so that the tail section points rearwardly of the point bringing the assembly into the intermediate position. During this rotation nodes 30 freely pass under stepped recess 27 and do not contact the foot. From the intermediate position the cultivator point is moved rearwardly of the adaptor resulting in peripheral edges 19 of elongate section 20 to slide in lateral grooves 21 thereby securely maintaining the cultivator point in a ground working position as best illustrated in FIG. 2.

FIG. 1 illustrates an upper end 36 of the adaptor fixed onto the depending tyne 13 by a bolt 37 through bolt slot 38 on the adaptor. The longitudinal shape of bolt slot 38 allows for a higher or lower positioning of the bolt thereby adjusting the vertical/forward position of the adaptor on the tyne. The adaptor generally functions as an attachment means between the cultivator point and the tyne and typically remains fixed to the tyne even though the cultivator point may be replaced due to wear.

The cultivator point 12 with the flat mounting section 18 containing the aperture 17, and the ground working edge 25 extending from a forward end of the mounting section, further has two downwardly angled wings 39 extending laterally and substantially between the mounting section and the ground working edge. The ground working edge is typically of a hard material such as tungsten carbide which will withstand a high degree of use with minimal wear. A ridge 40 forms an upper edge of the ground working point and serves to divide and deflect a stream of material thrown up by the cultivator during tilling or sowing.

The cultivator point is structured such that when attached to the tyne the ground working edge is lower than the lowest point 39a on the wings. In this way as the cultivator point is driven through the ground the ground working edge digs a deep, narrow furrow. The wings follow spreading the soil and digging a wider and shallower furrow, simultaneously covering the first deeper furrow. Consequently, the ground is minimally turned which avoids exposing lumps and burying straw. Typically, the depth of the narrow furrow is 4 inches below the ground surface and the shallow furrow is 2 inches below the ground surface, however these depths may vary depending on the height adjustment of the adaptor on the tyne.

Fertiliser is added to the deep furrow before the furrow is covered through a fertiliser hose 41 (FIG. 1) positioned behind the ground working edge. As the wings spread the soil to create a shallower furrow the fertiliser is covered. A grain hose 42 located behind the cultivator point assembly deposits grain in the shallow furrow. The grain is then covered with soil and pressed into the ground by a press wheel (not shown) trailing behind the cultivator point.

It will be understood to persons skilled in the art of the invention that many modifications may be made without departing from the spirit and scope of the invention.

What is claimed is:

1. A cultivator point assembly including:
   an adaptor having a front end, a rear end, an upper end and a foot projecting from a lower end;
   a cultivator point coupled to the adaptor and having a mounting section and a forward ground-working edge;
   an aperture in the mounting section, the foot of the adaptor extending through the aperture in a first reversed position, whereafter when the cultivator point is rotated 180° relative to the adaptor into an intermediate position in which the ground working edge is in a forward facing position relative to the adaptor, the cultivator point is movable rearwardly relative to the adaptor into a working position; and
   a stop, including a first structure on the cultivator point and a second structure on the adaptor, wherein one of the first or second structures comprises a releasable detent that engages the other of the first or second structures to prevent the cultivator point unintentionally moving into the reversed position.

2. The cultivator point assembly claimed in claim 1 wherein the first structure comprises the releasable detent on the mounting section engageable with said second structure in the form of a tongue protruding from the rear of the adaptor to prevent the cultivator point unintentionally moving out of the working position.

3. The cultivator point assembly claimed in claim 2 wherein the detent is a bolt insertable through a hole in the mounting section at a rear of the cultivator point.

4. The cultivator point assembly claimed in claim 1 wherein the first structure comprises the releasable detent on the mounting section engageable with the second structure in the form of a recess on the rear of the adaptor to prevent rotation and detachment of the cultivator point if, in use, the cultivator point is unintentionally moved out of the working position.

5. The cultivator point assembly claimed in claim 4 wherein the detent is a bolt insertable through a hole in the mounting section at a rear of the cultivator point.

6. The cultivator point assembly claimed in claim 1 wherein the first structure comprises the releasable detent on the mounting section which is engaged with the second structure which is provided on a tail section of the foot.

7. The cultivator point assembly claimed in claim 1 wherein the cultivator point has two wing sections between the mounting section and the ground working edge and, in relation to the mounting section, the ground working edge depends lower than the wing sections.

\* \* \* \* \*